(12) United States Patent
Yang et al.

(10) Patent No.: US 10,976,623 B2
(45) Date of Patent: Apr. 13, 2021

(54) ARRAY SUBSTRATE AND DISPLAY DEVICE

(71) Applicant: Xiamen Tianma Micro-Electronics Co., Ltd., Xiamen (CN)

(72) Inventors: Xu Yang, Xiamen (CN); Bozhi Liu, Xiamen (CN); Guozhao Chen, Xiamen (CN)

(73) Assignee: XIAMEN TIANMA MICRO-ELECTRONICS CO., LTD., Shanghai (CN)

( * ) Notice: Subject to any disclaimer, the term of this patent is extended or adjusted under 35 U.S.C. 154(b) by 0 days.

(21) Appl. No.: 16/724,410

(22) Filed: Dec. 23, 2019

(65) Prior Publication Data

US 2020/0124932 A1    Apr. 23, 2020

(30) Foreign Application Priority Data

Sep. 27, 2019 (CN) .......................... 201910923996.6

(51) Int. Cl.
*G02F 1/1333* (2006.01)
*G02F 1/1362* (2006.01)
(Continued)

(52) U.S. Cl.
CPC .... *G02F 1/136286* (2013.01); *G02F 1/13338* (2013.01); *G02F 1/136209* (2013.01);
(Continued)

(58) Field of Classification Search
CPC .............. B23K 2103/42; B23K 26/364; B29C 2791/009; B29C 59/16; B29D 2030/728; B29D 30/72; B60C 13/001; G02F 1/13338; G02F 1/136209; G02F 1/136286; G02F 2001/133357; G02F 2001/134372;
(Continued)

(56) References Cited

U.S. PATENT DOCUMENTS

2016/0233236 A1*  8/2016  Lai .................. G02F 1/1362
2018/0165533 A1*  6/2018  Cho ................. G02F 1/136
(Continued)

FOREIGN PATENT DOCUMENTS

CN    101930133 A    12/2010
CN    109445161 A    3/2019

*Primary Examiner* — Hong Zhou
(74) *Attorney, Agent, or Firm* — Kilpatrick Townsend & Stockton, LLP

(57) ABSTRACT

An array substrate and a display device are disclosed. The array substrate includes a display region including a first display region and an optical device arranging region. The first display region at least partly surrounds the optical device arranging region. The array substrate further includes a base substrate; an optical device, a shielding structure and a signal line arranged on the base substrate. The optical device and the shielding structure are located in the optical device arranging region, the optical device has an opening for receiving light, and orthographic projections of the opening and the shielding structure on the base substrate have no overlap. The shielding structure extends in a first direction, the signal line extends in a second direction, the first direction intersects with the second direction, the shielding structure includes at least two subsections, and the signal line is correspondingly arranged in a gap between two adjacent subsections.

16 Claims, 10 Drawing Sheets

(51) Int. Cl.
  *G06F 3/042* (2006.01)
  *G06K 9/00* (2006.01)
(52) U.S. Cl.
  CPC .............. *G06F 3/0421* (2013.01); *G02F 2001/133357* (2013.01); *G06K 9/0004* (2013.01)
(58) Field of Classification Search
  CPC ........... G02F 2001/13685; G06F 21/32; G06F 3/0421; G06K 9/0004
  See application file for complete search history.

(56) References Cited

U.S. PATENT DOCUMENTS

| | | | |
|---|---|---|---|
| 2018/0247100 A1* | 8/2018 | Zhu | G06K 9/0004 |
| 2018/0285617 A1* | 10/2018 | Liu | H01L 21/84 |
| 2019/0026530 A1* | 1/2019 | Wu | G06K 9/00 |
| 2019/0065809 A1* | 2/2019 | Li | G06F 3/0421 |
| 2020/0026899 A1* | 1/2020 | Sun | H01L 27/3272 |
| 2020/0202099 A1* | 6/2020 | Sun | H01L 27/14625 |

\* cited by examiner

ARRAY SUBSTRATE AND DISPLAY DEVICE

CROSS REFERENCE TO RELATED APPLICATION

This application claims priority to Chinese Patent Application No. 201910923996.6, filed with the Chinese Patent Office on Sep. 27, 2019. The entire disclosure of the above application is incorporated herein by reference.

FIELD

The disclosure relates to the field of display technologies and particularly to an array substrate and a display device.

BACKGROUND

The liquid crystal display is a kind of non-self light-emitting device, and thus backlight is required to implement the display function by using the backlight source provided by the backlight module.

The display panel in the liquid crystal display generally has a display region and a frame region surrounding the display region. A fingerprint identification device and other optical devices may be arranged in the frame region. Due to the larger volume of the fingerprint identification device, the area of the frame region occupied by the fingerprint identification device is larger, causing a greater limitation in implementing the high screen-to-body ratio and implementing the narrow frame design.

Thus, how to increase the screen-to-body ratio of the display panel and implement the narrow frame design which urgently needs to be solved.

SUMMARY

The embodiments of the disclosure provide an array substrate and a display device, to increase the screen-to-body ratio of the display panel and implement the narrow frame design.

In one embodiment of the disclosure provides an array substrate. The array substrate includes a display region including a first display region and an optical device arranging region. The first display region at least partly surrounds the optical device arranging region. The array substrate further includes a base substrate; an optical device, a shielding structure and a signal line arranged on the base substrate. The optical device and the shielding structure are both located in the optical device arranging region, the optical device has an opening for receiving light, and orthographic projections of the opening and the shielding structure on the base substrate have no overlap. The shielding structure extends in a first direction, the signal line extends in a second direction, the first direction intersects with the second direction, the shielding structure includes at least two subsections, and the signal line is correspondingly arranged in a gap between two adjacent subsections.

In one embodiment of the disclosure provides a display device including a display panel. The display panel includes an array substrate and an opposite substrate arranged oppositely. The array substrate is the above-mentioned array substrate as provided by the embodiment of the disclosure.

Where:
A—display region
A1—first display region
C—optical device arranging region
B—frame region
10—optical device
11—opening
12—optical diode
12a—P-type structure
12b—semiconductor structure
12c—N-type structure
20—shielding structure
20a, 20b—subsection
30—signal line
40—planarization layer
41—groove
50—finger
51—fingerprint ridge
52—fingerprint valley
60—base substrate
70—pixel electrode
80—common electrode
P1—first pixel
P2—second pixel
101—array substrate
102—opposite substrate
103—liquid crystal
100—display panel
200—backlight module
M—display device

DETAILED DESCRIPTION OF EMBODIMENTS

The array substrate and display device according to embodiments of the disclosure are described with reference to the accompanying drawings. It is necessary to note that the described embodiments are only a part of but not all the embodiments of the disclosure.

Figure 1:
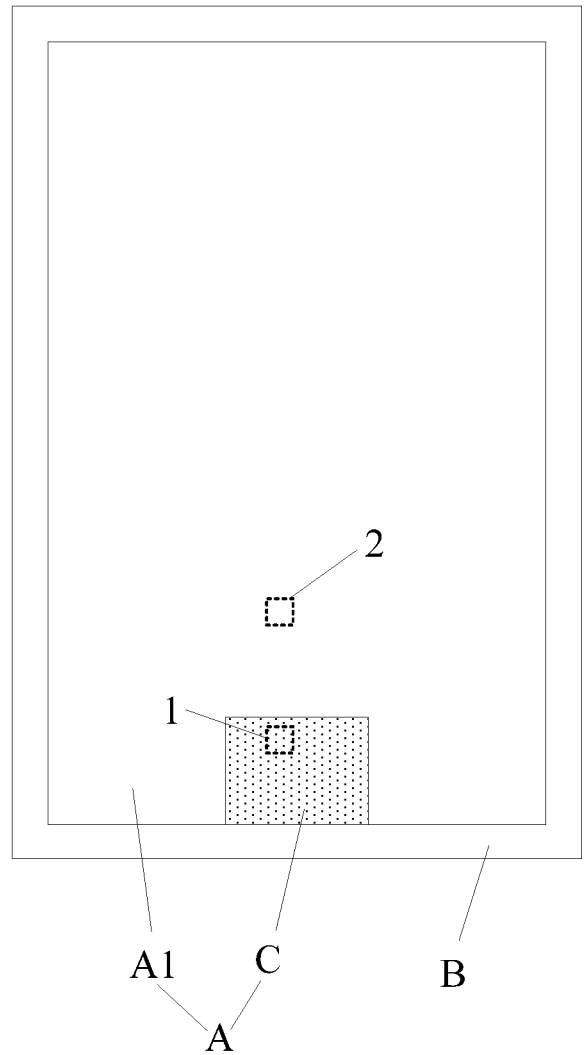
FIG. 1 is a structural schematic diagram of an array substrate provided in some embodiments of the disclosure.
Figure 2:
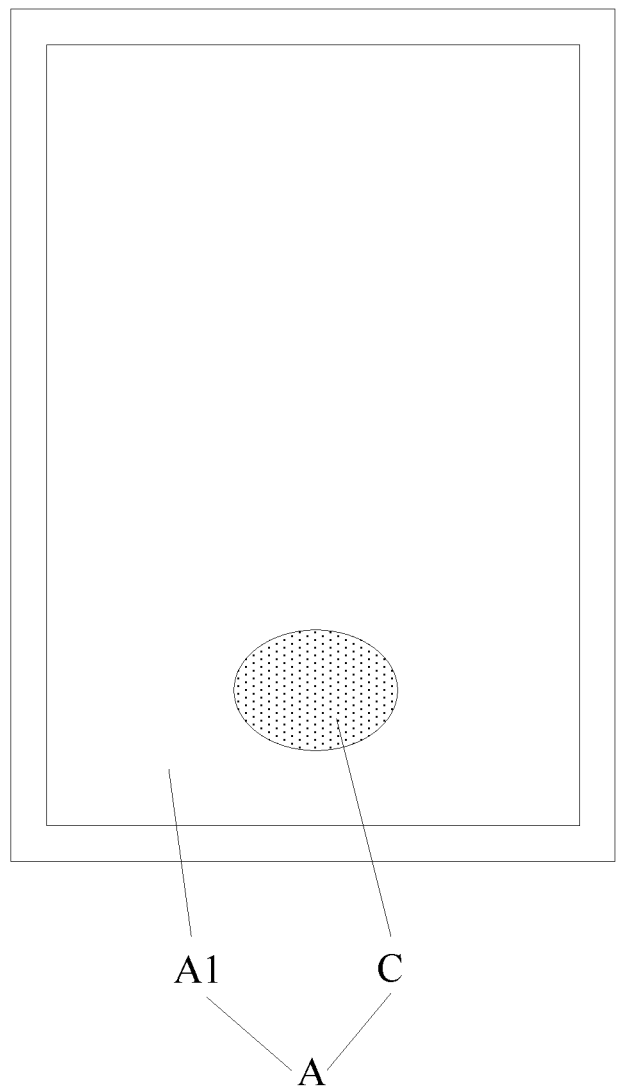
FIG. 2 is a structural schematic diagram of another array substrate provided in some embodiments of the disclosure.
Figure 3:
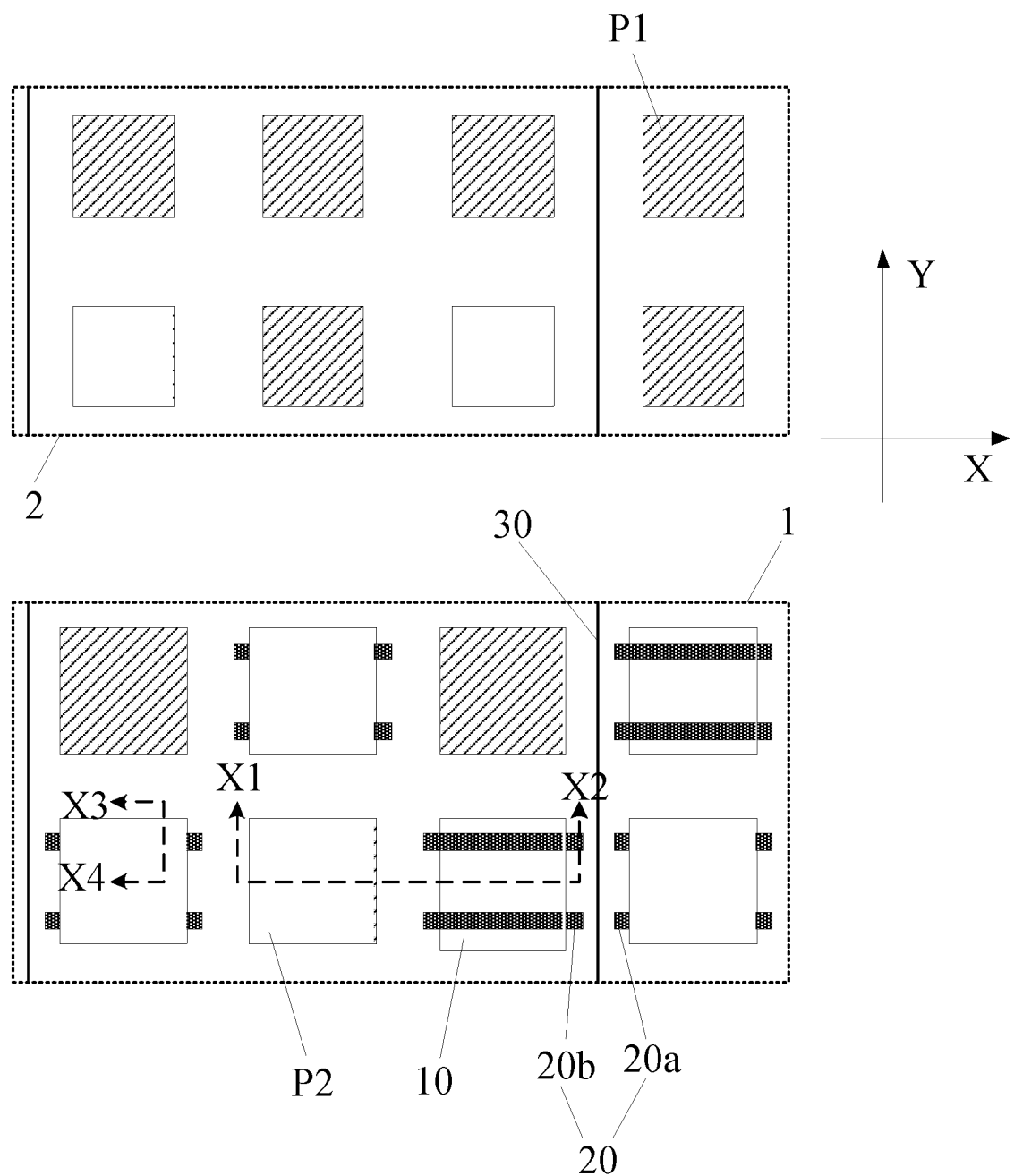
FIG. 3 is an enlarged view of portions inside the dotted boxes 1 and 2 indicated in FIG. 1.
Figure 4:
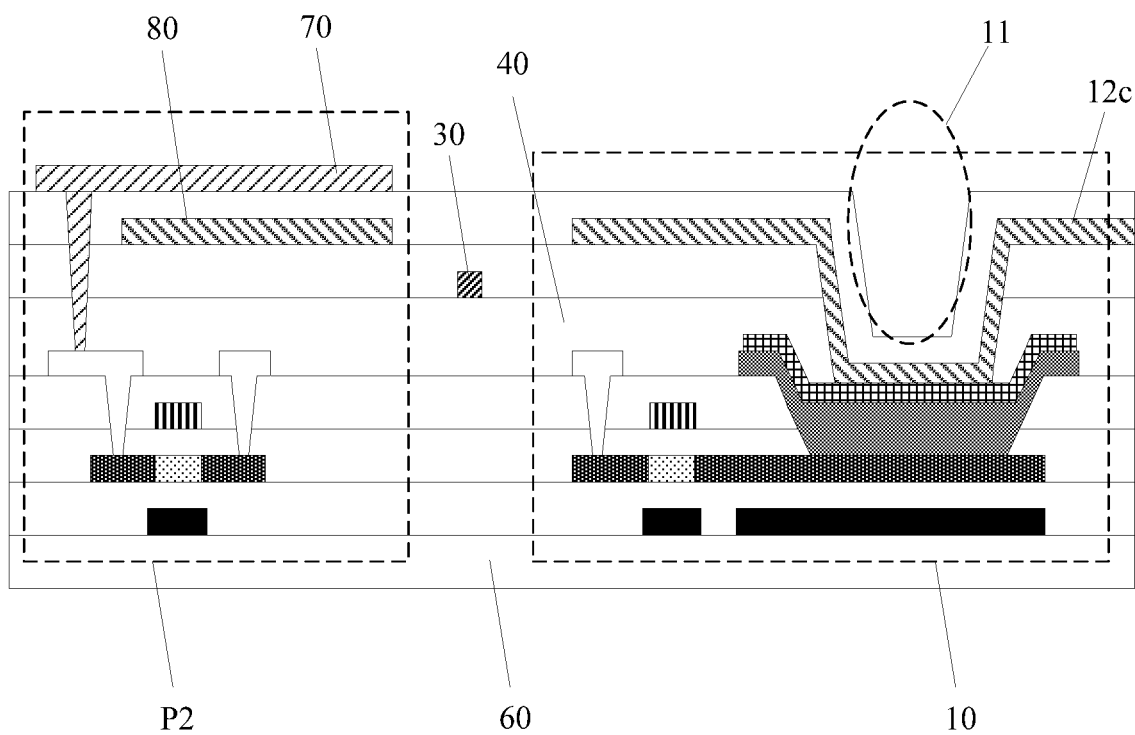
FIG. 4 is a cross-sectional view taken along the line X1-X2 indicated in FIG. 3.
Figure 5:
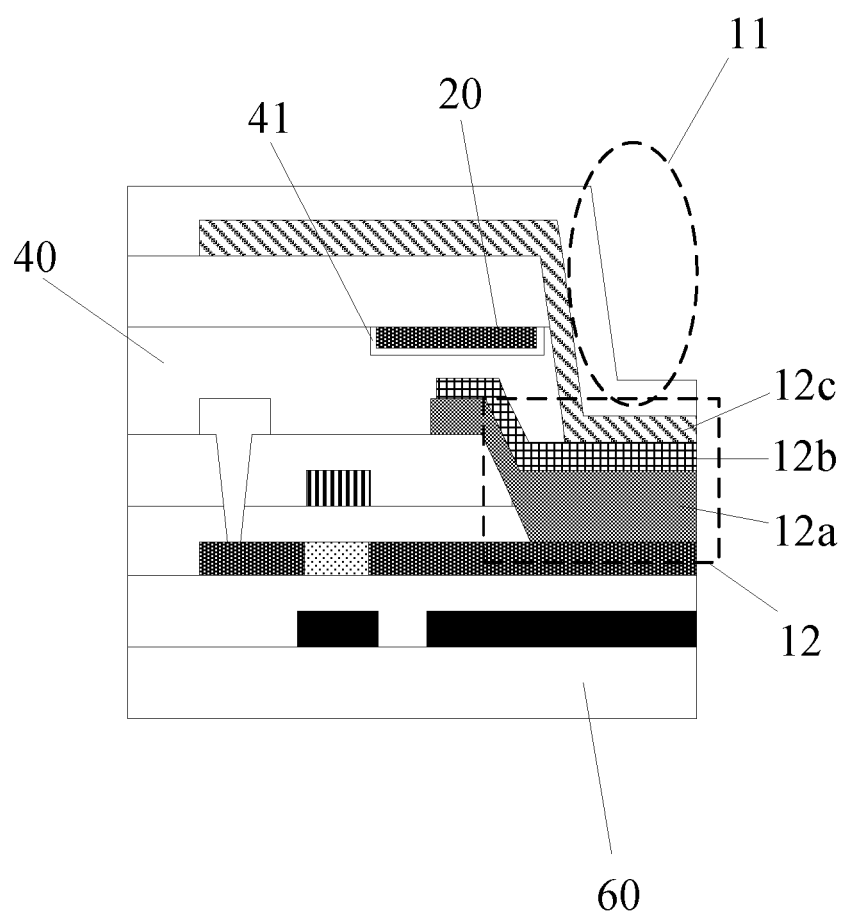
FIG. 5 is cross-sectional view taken along the line X3-X4 indicated in FIG. 3.
Figure 6:
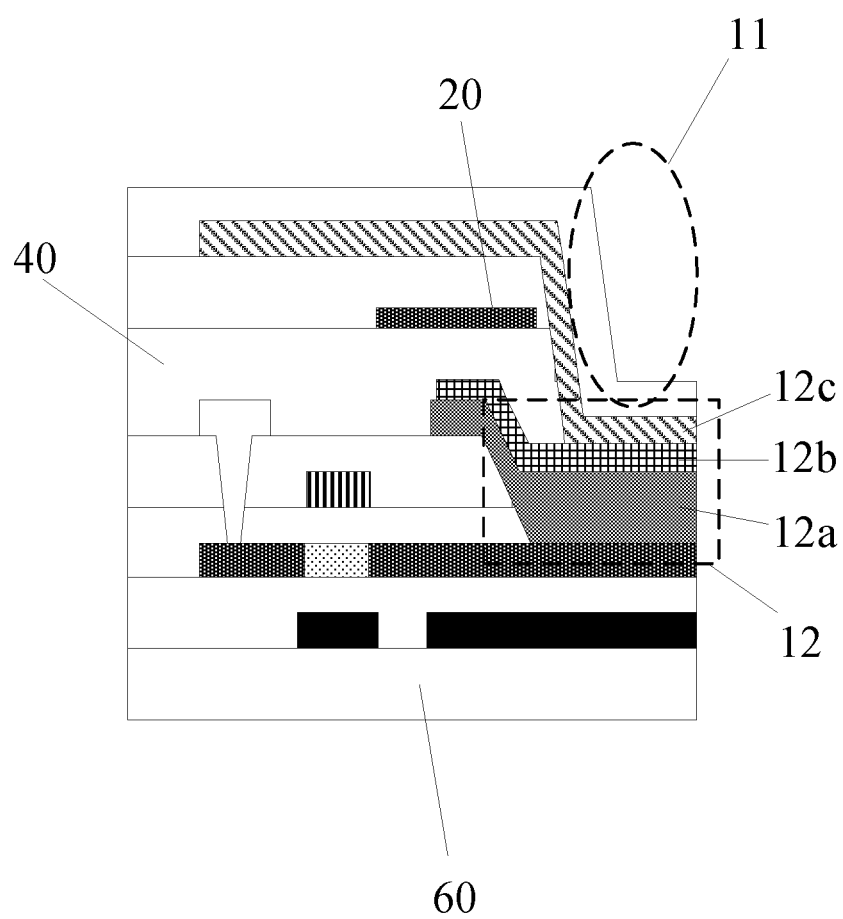
FIG. 6 is another cross-sectional view taken along the line X3-X4 indicated in FIG. 3.

The embodiments of the disclosure provide an array substrate, as shown in FIGS. 1-6. FIG. 1 is a structural schematic diagram of an array substrate, FIG. 2 is a structural schematic diagram of another array substrate, FIG. 3 is an enlarged view of the dotted boxes 1 and 2 indicated in FIG. 1, FIG. 4 is a cross-sectional view taken along the line X1-X2 indicated in FIG. 3, FIG. 5 is cross-sectional view taken along the line X3-X4 indicated in FIG. 3, and FIG. 6 is another cross-sectional view taken along the line X3-X4 indicated in FIG. 3.

As shown in FIGS. 1 and 2, the array substrate can include a display region A. The display region A includes a first display region A1 and an optical device arranging region C, where the first display region A1 at least partly surrounds the optical device arranging region C. Here the first display region A1 is a general display region, without any optical device arranged therein.

In one or more embodiments, as shown in FIG. 1, the optical device arranging region C is located at the edge of the display region A, i.e., arranged close to the frame region B, and partly surrounded by the first display region A1; or in one or more embodiments, as shown in FIG. 2, the optical device arranging region C is located inside the display region A, and completely surrounded by the first display region A1.

In one or more embodiments, the shape of the optical device arranging region C may be the square (as shown in FIG. 1), oval (as shown in FIG. 2) or another shape, which can be designed according to the shape of the optical device and is not limited here.

As shown in FIGS. 3-6, the array substrate further includes:

a base substrate 60;

an optical device 10, a shielding structure 20 and a signal line 30 arranged successively on the base substrate 60, where the optical device 10 and the shielding structure 20 are both located in the optical device arranging region C, the optical device 10 has an opening 11 for receiving the light, and the orthographic projections of the opening 11 and the shielding structure 20 on the base substrate 60 have no overlap;

the shielding structure 20 extends in the first direction (such as the X direction in FIG. 1), the signal line 30 extends in the second direction (such as the Y direction in FIG. 3), the first direction intersects with the second direction, the shielding structure 20 includes at least two subsections (such as 20a and 20b in FIG. 3), and the signal line 30 is correspondingly arranged in the gap between two adjacent subsections.

In the embodiments of the disclosure, the display region A includes the optical device arranging region C, and the optical device is arranged in the optical device arranging region C rather than the frame region, to avoid a relatively large occupying area at the frame, so that the frame can be made narrower to increase the screen-to-body ratio and achieve a narrow frame design.

And, the shielding structure 20 includes at least two subsections (such as 20a and 20b in FIG. 3), and the signal line 30 is correspondingly arranged in the gap between two adjacent subsections, so that there is a flat surface in the region required to fabricate the signal line 30 in the extending direction of the signal line 30, which avoids the problem of the low exposure accuracy caused by the segment gap due to the uneven surface, and thus avoids the line breakage problem caused by the non-uniform width of the fabricated signal line 30 due to the low exposure accuracy, that is, the accuracy of the exposure process can be increased, the signal lines with uniform width can be obtained and the line breakage probability can be reduced, increasing the reliability of the array substrate.

Figure 7:
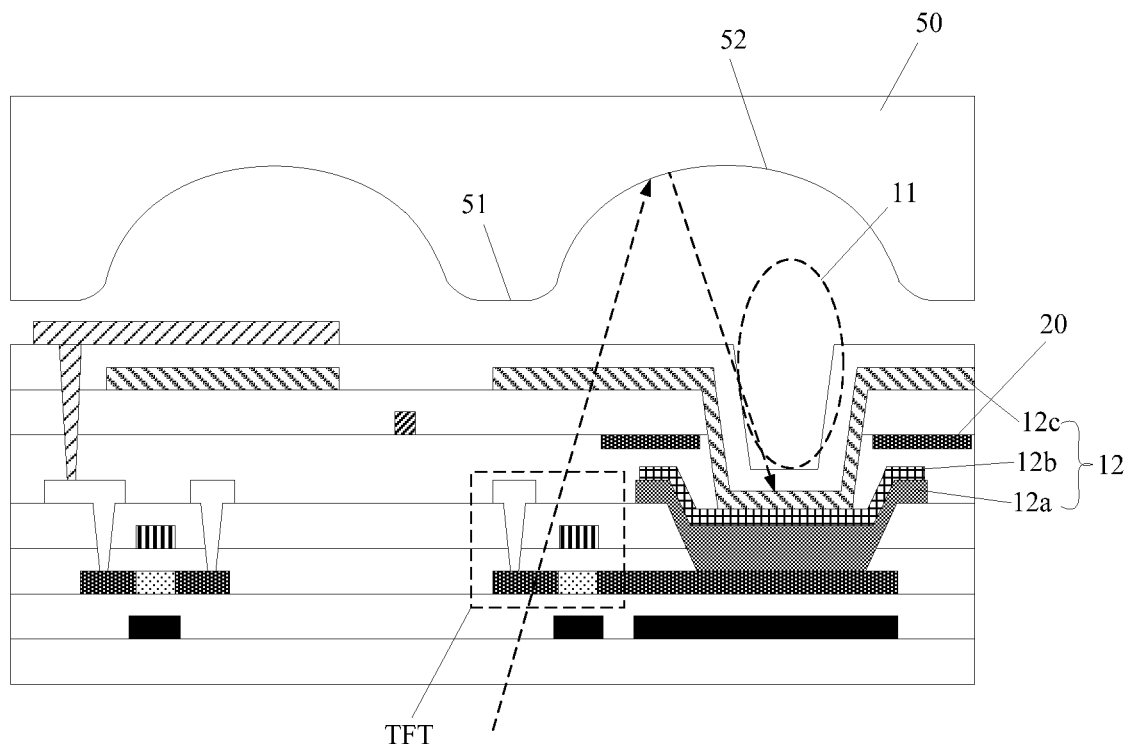
FIG. 7 is a schematic diagram for illustrating the fingerprint identification principle.

In one or more embodiments, the optical device 10 is a fingerprint identification device, and referring to FIG. 7 which is used to illustrate the fingerprint identification principle, the fingerprint identification device only receive the light through the region corresponding to the opening 11 by the arranging the shielding structure 20, to reduce the influence of the other impurity light on the fingerprint identification device, increase the identification accuracy of the fingerprint identification device and increase the identification sensitivity of the fingerprint identification device.

In one or more embodiments, the optical device includes a PIN photodiode 12, for example, as shown in FIGS. 5 and 6, the PIN photodiode 12 includes a P-type structure 12a, a semiconductor structure 12b and an N-type structure 12c in laminated construction.

Here, the operation principle of the PIN photodiode 12 is as follows.

As shown in FIG. 7, when the light irradiates the surface of finger 50, the surface of finger 50 reflects the incident light, that is, reflects the incident light into the PIN photodiode 12. After receiving the light, the semiconductor structure 12b in the PIN photodiode 12 absorbs the light energy and produces the electron-hole pairs. Next, the electrons move to the N-type structure 12c and the holes toward the P-type structure 12a by the built-in electric field, and then the electrons and holes are exported to form the current signals through the traveling lines electrically connected to the N-type structure 12c and the P-type structure 12a respectively.

The fingerprint identification process is as follows.

The fingerprint of the finger 50 has fingerprint ridges 51 and fingerprint valleys 52, as shown in FIG. 7, and the fingerprint ridge 51 and the fingerprint valley 52 have different reflecting effects on the light, so that the lights reflected into the optical device (i.e., fingerprint identification device) have different energies, and thus the current signals produced by the optical device also have different magnitudes. The fingerprint identification can be implemented through different currents produced by the optical device.

In one or more embodiments, besides the PIN photodiode 12, the optical device further includes other structures for implementing the function of the optical device, for example transistor (such as TFT shown in FIG. 7 which can control the current signals produced in the PIN photodiode 12 to be exported) or the like, which can refer to the related art and will not be described here in details.

Here, the fabrication materials of the N-type structure 12c, the semiconductor structure 12b and the P-type structure 12a in the PIN photodiode 12 is not limited here as long as the fabrication materials can be used to implement the functions of the N-type structure 12c, the semiconductor structure 12b and the P-type structure 12a. The fabrication materials may be selected according to the actual demand, to meet the requirements of different application scenarios and increase the design flexibility.

It is noted that, in one or more embodiments, the optical device can also be the structure implementing other functions and is not limited to the fingerprint identification device, and may be set according to the actual demand, to meet the requirements of different application scenarios and increase the design flexibility.

Figure 8:
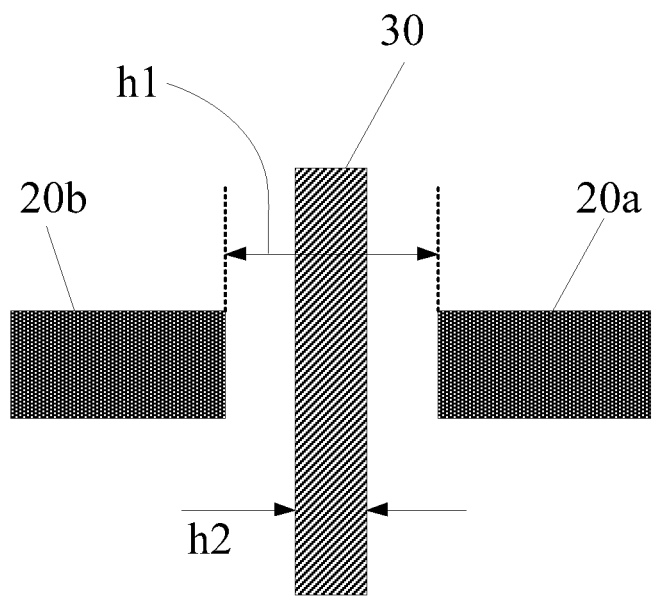
FIG. 8 is a schematic diagram of the arrangement relationship between the shielding structure and the signal line provided in some embodiments of the disclosure.

In one or more embodiments of the disclosure, in the gap between two adjacent subsections (such as 20a and 20b), one signal line 30 is correspondingly arranged, as shown in FIGS. 3 and 8. FIG. 8 is a schematic diagram of the arrangement relationship between the shielding structure 20 and the signal line 30.

Such arrangement is designed for the reasons as follows.

On the one hand, when signal lines 30 are arranged between two adjacent subsections, a relatively large spacing between two adjacent subsections is required, and thus the sizes of all the subsections is required to reduce relatively to have a bad effect on the shielding function of shielding structure 20. While the arrangement of one signal line being correspondingly arranged in the gap between two adjacent subsections can avoid said bad effect to allow the shielding structure 20 to have the better shielding function.

On the other hand, when signal lines 30 are arranged between two adjacent subsections, a relatively small distance between two subsections and the signal lines 30 close to the two subsections is required, and thus when the signal lines 30 are fabricated, the risk of non-uniform widths of the signal lines 30 due to the closer distance from the signal lines 30 to the edge of the subsection is relatively high. While the arrangement of one signal line being correspondingly arranged in the gap between two adjacent subsections can reduce said risk, to avoid the line breakage problem and allow the effective transmission of the signals over the signal lines 30.

On yet another hand, since the distance between two adjacent subsections is limited, when signal lines 30 are arranged between two adjacent subsections, the distance between adjacent signal lines 30 is relatively small, and the risk of short circuit is easy to occur. Such arrangement can avoid this problem, to allow the effective transmission of the signals over the signal lines 30.

In one or more embodiments of the disclosure, the distance between two adjacent subsections is larger than the width of the signal line.

In one embodiment, as shown in FIG. 8, two adjacent subsections are marked as 20a and 20b respectively, the distance between the subsections 20a and 20b is h1, and the width of the signal line 30 is h2, here h1 is larger than h2.

Such arrangement can reduce the bad influence of the subsections on the signal lines 30 in the fabrication process to allow the fabricated signal lines 30 to have the uniform widths, and also allow the effective transmission of the signals over the signal lines 30 and avoid the line breakage problem.

In one or more embodiments of the disclosure, the distance h1 between two adjacent subsections may be set as 4~8 μm, and the width h2 of the signal line 30 may be set as 4~7 μm. Of course, they are not limited thereto, as long as the bad influence of the subsections on the signal lines 30 in the fabrication process can be avoided.

In one or more embodiments of the disclosure, the shielding structure can be made from any material having the light-shielding function, such as black organic material, metal or other inorganic material or the like, which is not limited here.

In one or more embodiments of the disclosure, the array substrate further includes a planarization layer. The planarization layer is located at the first side of the shielding structure 20 facing the base substrate 60. As shown in FIGS. 5 and 6, the planarization layer 40 is located between the semiconductor structure 12a and the shielding structure 20.

Thus a flat surface is acquired when facilitating the signal lines 30 by arranging the planarization layer, to facilitate the width uniformity of the signal lines 30, as shown in FIG. 4, and also simplify the difficulty of fabricating the signal lines 30, increasing the production efficiency and the yield of the array substrate.

In one or more embodiments of the disclosure, there are several ways of setting the position relationship between the shielding structure 20 and the planarization layer as follows.

First way:

In one or more embodiments, as shown in FIG. 6, the shielding structure 20 is arranged on the surface of the side of the planarization layer 40 far away from the base substrate 60, and any region of the surface of the side of the planarization layer 40 far away from the base substrate 60 is a flat surface.

At this time, the shielding structure 20 has subsections and the signal line is located between two subsections, so the structure arrangement in FIG. 6 can also facilitate getting signal lines with the uniform widths to reduce the line breakage probability, to allow the transmission of the signals over the signal lines and increase the reliability of the array substrate.

Second way:

In one or more embodiments, as shown in FIG. 5, the planarization layer 40 has a groove 41 on the surface of the side of the planarization layer 40 facing the signal line, and the shielding structure 20 is located in the groove 41.

In this way, by arranging the shielding structure 20 in the groove 41, the surface of the side of the entirety constituted by the shielding structure 20 and the planarization layer 40 far away from the base substrate is relatively flat, to avoid the problem of the non-uniform widths of the signal lines caused by the segment gap due to the shielding structure 20 when fabricating the signal lines, and thus the width uniformity of the signal lines can be increased to reduce the line breakage probability, and allowing the transmission of the signals over the signal lines, and increasing the reliability of the array substrate.

In one or more embodiments of the disclosure, the plane where the surface of the second side of the shielding structure 20 far away from the base substrate is located is the first plane, and the plane where the surface of the side of the planarization layer 40 far from the base substrate and except for the groove 41 is located is the second plane, here the first and second planes are the same plane.

Figure 9:
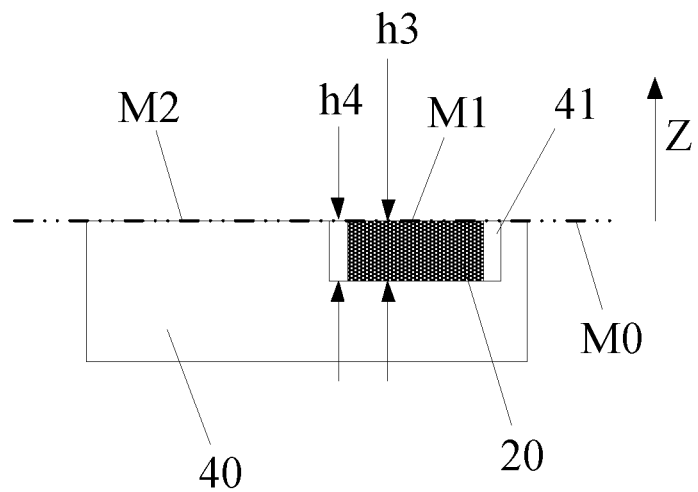
FIG. 9 is a schematic diagram of the position relationship between the shielding structure and the planarization layer provided in some embodiments of the disclosure.

In one embodiment, in the schematic diagram of the position relationship between the shielding structure 20 and the planarization layer 40 as shown in FIG. 9, the first plane is represented by M1, and the second plane is represented by M2, where the first plane M1 and the second plane M2 are both in the plane M0.

Thus, it is ensured that the surface of the side of the entirety constituted by the shielding structure 20 and the planarization layer 40 far away from the base substrate has the very flat surface, which facilitates increasing the width uniformity of the signal lines, allows the transmission of the signals over the signal lines, and thus facilitates increasing the reliability of the array substrate greatly.

In one or more embodiments of the disclosure, the depth of the groove 41 is approximately equal to the length of the shielding structure 20 in the direction perpendicular to the surface of the base substrate.

In one embodiment, as shown in FIG. 9, the depth of the groove 41 is represented by h4, the direction perpendicular to the surface of the base substrate is represented by Z, and the length of the shielding structure 20 in the Z direction is the thickness of the shielding structure 20 and represented by h3, where h3 is approximately equal to h4.

Here, in the actual fabrication process, the depth h4 of the groove may be set as 2.7~4 μm, and the area of the bottom surface of the groove may be set as 5*5~10*10 μm². At this time, the thickness h3 of the shielding structure may also be set as 2.7~4 μm, and the largest area of the surface of the shielding structure parallel to the bottom surface of the groove may also be set as 5*5~10*10 μm² or less than 5*5 μm². The specific sizes of the groove and the shielding structure are not limited here, as long as the shielding structure can be arranged in the groove.

In this way, the shielding structure 20 can be arranged in the groove 41, and thus the surface of the side of the entirety constituted by the shielding structure 20 and the planarization layer 40 far away from the base substrate is a flat surface, to avoid a bad effect in the fabrication process of the signal lines and increase the reliability of the array substrate.

In the first and second ways described above, it can be ensured that the signal lines have the relatively uniform widths, to ensure the efficient transmission of the signals. And in the actual situation, the first or second way can be selected according to the actual situation, and is not limited here.

Figure 10:
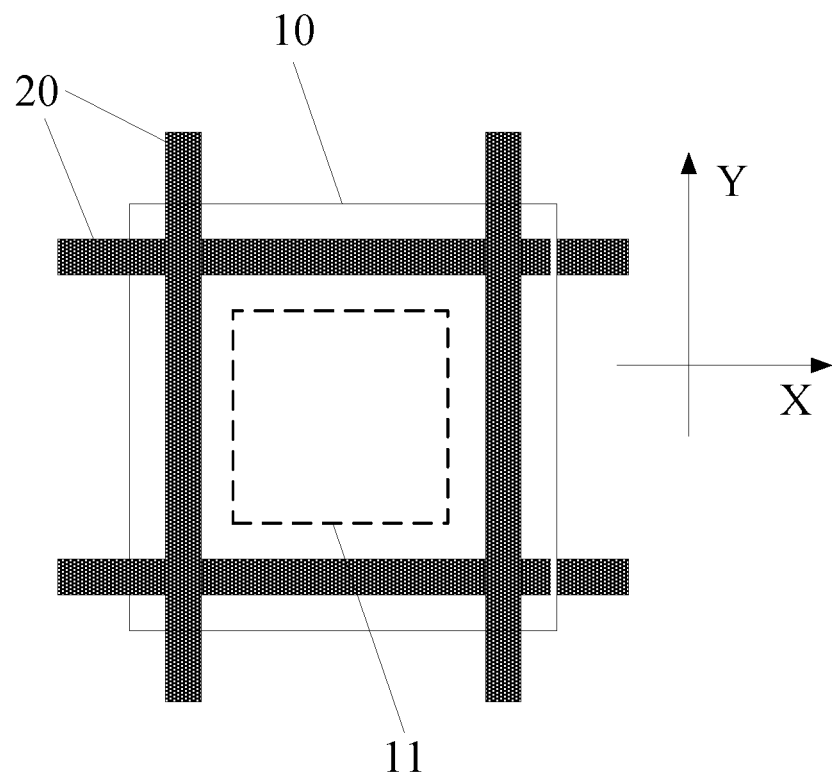
FIG. 10 is a schematic diagram of the arrangement relationship between the optical device and the shielding structures provided in some embodiments of the disclosure.

In one or more embodiments, for the arrangement of the shielding structures 20, the shielding structures 20 may be arranged in the Y direction as shown in FIG. 3, or may be arranged in both the X and Y directions as shown in FIG. 10 which is a schematic diagram of the arrangement relationship between the optical device and the shielding structures 20, that is to say, the shielding structures 20 are arranged around the optical device, so that the shielding structures 20 can be arranged around the opening 11 to shield the impurity light around the opening 11 effectively. Thus when the optical device is the fingerprint identification device, the identification accuracy and the identification sensitivity of the fingerprint identification device can be increased effectively, and the performance of the display device can be improved greatly.

In one or more embodiments of the disclosure, the signal line may be the touch control signal line, so that the display panel fabricated by using the above-mentioned array substrate according to the embodiments of the disclosure has the touch control function, to develop the function of display panel and extend the application field of display panel.

In one or more embodiments of the disclosure, the display region includes pixels. The pixels include the first pixels located in the first display region A1 and the second pixels located in the optical device arranging region C.

Here, the arranging density of the first pixels is greater than the arranging density of the second pixels.

In one embodiment, as shown in FIG. 3, an enlarged view of a portion inside the optical device arranging region C is shown in dashed box 1, the dashed box 2 an enlarged view of a portion inside the first display region A1 is shown in dashed box 2, P1 represents the first pixel, and P2 represents the second pixel, where the arranging density of the first pixels P1 is greater than the arranging density of the second pixels P2.

Such arrangement is set for reasons as follows.

On the one hand, the optical device arranging region C may also have the display function, to facilitate increasing the display uniformity of the display panel and improving the display effect.

On the other hand, since the arranging density of the second pixels P2 is smaller, the optical device may be arranged between the adjacent second pixels P2, so that more light may be provided to the optical device, to improve the performance of the optical device and improve performance of the display panel.

In one or more embodiments, the arrangement of the second pixels P2 is not limited to that as shown in FIG. 3 in the actual situation. The arranging density of the second pixels P2 is illustrated here just by taking FIG. 3 as an example, which does not mean that the arrangement of the second pixels P2 is only limited to that as shown in FIG. 3, that is, the arrangement of the second pixels P2 can be set according to the actual demand as long as the display effect can be improved and the performance of the display panel can be improved, and is not limited here.

In one or more embodiments of the disclosure, as shown in FIG. 3, the area of the orthographic projection of the first pixel P1 on the base substrate is the first area, and the area of the orthographic projection of the second pixel P2 on the base substrate is the second area, where the first area is smaller than the second area.

The arrangement is set for the reason as follows. The brightness of the optical device arranging region C may be lower than that of the first display region A1 due to a smaller arranging density of the second pixels P2. In order to balance the difference in brightness between the optical device arranging region C and the first display region A1, the optical device arranging region C can be increased by increasing the area of the orthographic projection of the second pixels P2 on the base substrate so that the brightness of the different regions become more uniform, thus improving the display uniformity effectively and improving the display effect.

Figure 11:
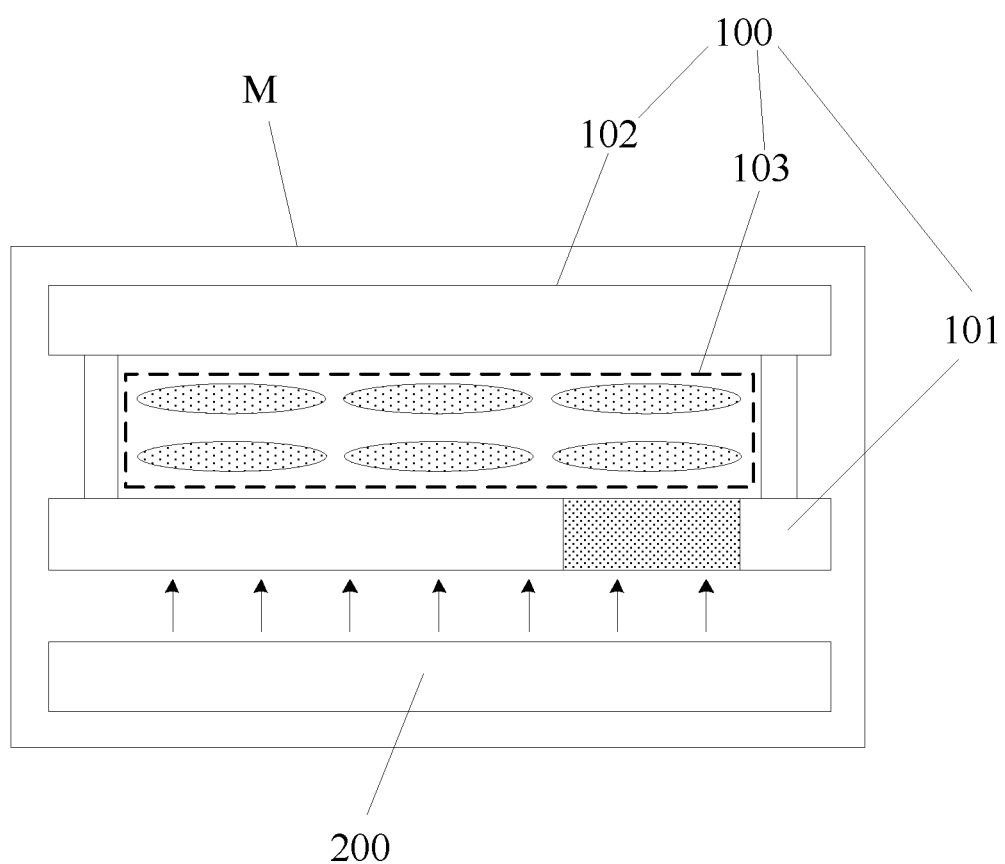
FIG. 11 is a structural schematic diagram of a display device provided in some embodiments of the disclosure.

Based upon the same inventive concept, embodiments of the disclosure provide a display device, and as shown in FIG. 11 which is a structural schematic diagram of the display device. In one or more embodiments, the display device includes a display panel 100;

the display panel 100 includes an array substrate 101 and an opposite substrate 102 arranged oppositely, where the array substrate 101 is the above-mentioned array substrate as provided by the embodiment of the disclosure.

In one or more embodiments, as shown in FIG. 11, the display panel 100 further includes the liquid crystals 103 arranged between the array substrate 101 and the opposite substrate 102.

In one or more embodiments of the disclosure, as shown in FIG. 11, the display device M further includes a backlight module 200, where the display panel 100 is located at the light-emitting side of the backlight module 200.

Here, as shown in FIGS. 4 and 11, the pixel electrode 70 and the common electrode 80 in the display panel 100 provide the driving voltage to the liquid crystals 103, and the driving voltage can drive the liquid crystals 103 to rotate, to let the lights of the backlight source provided by the backlight module 200 pass through the liquid crystals 103. The rotating angle of the liquid crystals 103 varies, so the amount of the light through the liquid crystals 103 varies, so that different pixels has different display brightness to implement the display function.

Of course, the pixel electrode 70 and the common electrode 80 are not limited to both arranging on the array substrate. In one or more embodiments, the pixel electrode 70 is arranged on the array substrate and the common electrode 80 is arranged on the opposite substrate, which can be set according to the actual demand, to meet the requirements of different application scenarios and increase the design flexibility.

It is noted that, in one or more embodiments, even if the pixel electrode 70 and the common electrode 80 are both arranged on the array substrate, the relative position relationship between the pixel electrode 70 and the common electrode 80 is not limited to that as shown in FIG. 4 and can be set according to the actual demand, which is not limited here.

In one or more embodiments, the PIN photodiode in the optical device is arranged in a way that, the N-type structure 12c is made of the same material and arranged in the same layer as the common electrode 80, as shown in FIG. 4, which simplifies the fabrication process of the array substrate and reduces the fabrication difficulty, and simultaneously further facilitates the decrease in the thickness of the array substrate, decreasing the thickness of the display panel and implementing the lightening and thinning design.

Figure 12:
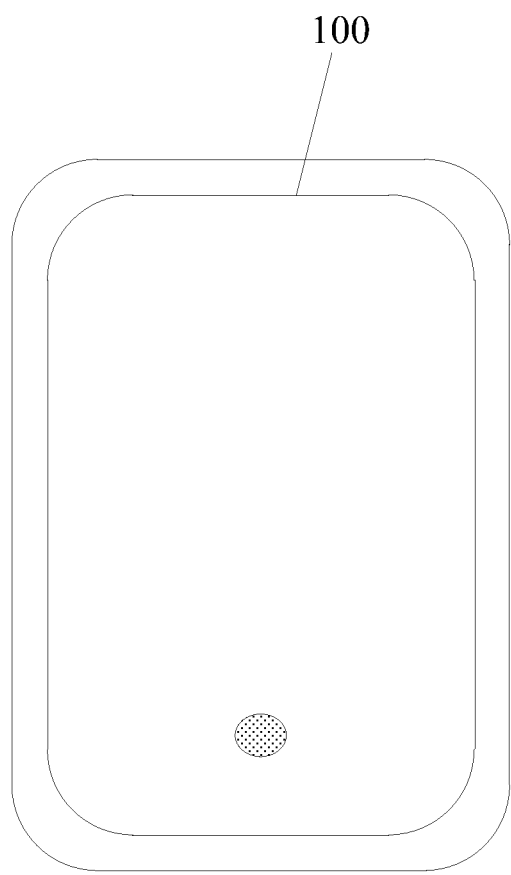
FIG. 12 is a structural schematic diagram of another display device provided in some embodiments of the disclosure.

In one or more embodiments, the display device may be a mobile phone (as shown in FIG. 12), a tablet, a television, a display, a laptop, a digital photo frame, a navigator, or any other product or component with display functions. The implementations of this display device can refer to the embodiments of the above-mentioned array substrate, and the repeated description thereof will be omitted here.

The embodiments of the disclosure provide the array substrate and the display device. Firstly the display region includes the optical device arranging region, and the optical device is arranged in the optical device arranging region rather than the frame region, to avoid a relatively large occupying area at the frame, so that the frame can be made narrower to increase the screen-to-body ratio and achieve a narrow frame design.

Secondly, the shielding structure includes at least two subsections, and the signal line is correspondingly arranged in the gap between two adjacent subsections, so that there is a flat surface in the region required to fabricate the signal line in the extending direction of the signal line, which avoids the problem of the low exposure accuracy caused by the segment gap due to the uneven surface, and thus avoids the line breakage problem caused by the non-uniform width of the fabricated signal line due to the low exposure accuracy, that is, the accuracy of the exposure process can be increased, the width uniformity of the signal lines can be improved and the line breakage probability can be reduced, increasing the reliability of the array substrate.

What is claimed is:

1. An array substrate, comprising:
    a display region comprising a normal display region and an optical device arranging region, wherein the normal display region at least partly surrounds the optical device arranging region;
    a base substrate;
    an optical device, a shielding structure and a signal line arranged on the base substrate; and
    a planarization layer located at a side of the shielding structure facing the base substrate;
    wherein the optical device and the shielding structure are both located in the optical device arranging region, the optical device has an opening for receiving light, and orthographic projections of the opening and the shielding structure on the base substrate have no overlap;
    the planarization layer has a groove at a side of the planarization layer facing the signal line, and the shielding structure is located in the groove; and
    the shielding structure extends in a first direction, the signal line extends in a second direction, the first direction intersects with the second direction, the shielding structure comprises at least two subsections, and the signal line is correspondingly arranged in a gap between two adjacent subsections.

2. The array substrate of claim 1, wherein one signal line is correspondingly arranged in the gap between the two adjacent subsections.

3. The array substrate of claim 2, wherein a distance between the two adjacent subsections is larger than a width of the signal line.

4. The array substrate of claim 1, wherein a plane where a surface of a side of the shielding structure far from the base substrate is located is a first plane, and a plane where a surface of a side of the planarization layer far from the base substrate and except for the groove is located is a second plane, wherein the first and second planes are a same plane.

5. The array substrate of claim 4, wherein a depth of the groove is approximately equal to a length of the shielding structure in a direction perpendicular to a surface of the base substrate.

6. The array substrate of claim 1, wherein the optical device comprises a P-I-N photodiode.

7. The array substrate of claim 1, wherein the signal line is a touch control signal line.

8. The array substrate of claim 1, wherein the display region comprises a plurality of pixels comprising first pixels located in the normal display region and second pixels located in the optical device arranging region;
    an arranging density of the first pixels is greater than an arranging density of the second pixels.

9. A display device, comprising a display panel;
    wherein the display panel comprises an array substrate and an opposite substrate arranged oppositely;
    wherein the array substrate comprises:
    a display region comprising a normal display region and an optical device arranging region, wherein the normal display region at least partly surrounds the optical device arranging region;
    a base substrate;
    an optical device, a shielding structure and a signal line arranged on the base substrate; and
    a planarization layer located at a side of the shielding structure facing the base substrate;
    wherein the optical device and the shielding structure are both located in the optical device arranging region, the optical device has an opening for receiving light, and orthographic projections of the opening and the shielding structure on the base substrate have no overlap;
    the planarization layer has a groove at a side of the planarization layer facing the signal line, and the shielding structure is located in the groove; and
    the shielding structure extends in a first direction, the signal line extends in a second direction, the first direction intersects with the second direction, the shielding structure comprises at least two subsections, and the signal line is correspondingly arranged in a gap between two adjacent subsections.

10. The display device of claim 9, wherein one signal line is correspondingly arranged in the gap between the two adjacent subsections.

11. The display device of claim 10, wherein a distance between the two adjacent subsections is larger than a width of the signal line.

12. The display device of claim 9, wherein a plane where a surface of a side of the shielding structure far from the base substrate is located is a first plane, and a plane where a surface of a side of the planarization layer far from the base substrate and except for the groove is located is a second plane, wherein the first and second planes are a same plane.

13. The display device of claim 12, wherein a depth of the groove is approximately equal to a length of the shielding structure in a direction perpendicular to a surface of the base substrate.

14. The display device of claim 9, wherein the optical device comprises a P-I-N photodiode.

15. The display device of claim 9, wherein the signal line is a touch control signal line.

16. The display device of claim 9, wherein the display region comprises a plurality of pixels comprising first pixels located in the normal display region and second pixels located in the optical device arranging region;
    an arranging density of the first pixels is greater than an arranging density of the second pixels.

* * * * *